Patented Mar. 26, 1929.

1,706,775

UNITED STATES PATENT OFFICE.

MAX DOHRN AND RALPH DIRKSEN, OF BERLIN-CHARLOTTENBURG, GERMANY, ASSIGNORS TO SCHERING-KAHLBAUM AKTIENGESELLSCHAFT.

METHOD OF PRODUCING PYRIDINE DERIVATIVES.

No Drawing. Application filed February 23, 1928, Serial No. 256,474, and in Germany March 31, 1927.

Our invention refers to pyridine derivatives and more especially to halogenated pyridones. Hitherto halogenated 2-pyridone has been produced only by diazotization of halogenated 2-amino pyridine.

We have now found that it is also possible to obtain this substance by direct halogenation of 2-pyridone. According to the particular conditions of operating, either mono- or dihalogenated compounds are obtained.

Example 1.

Into a solution of 2-pyridone in chloroform chlorine gas is introduced. After removal of the chloroform by distillation a crystalline mass is obtained which consists of a mixture of 2-oxy-5-chloropyridine

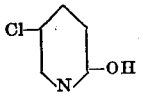

and 2-oxy-3.5-chloropyridine

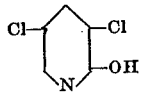

which can be separated by means of benzene.

Example 2.

20 grams 2-pyridone are dissolved in 25 ccms. dilute hydrochloric acid and to the solution is added a solution of 35 grams iodine mono chloride in dilute hydrochloric acid. After several hours' standing at room temperature the 2-oxy-3.5-iodine pyridine

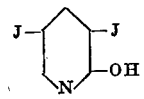

separates out in pure state.

Various changes may be made in the details disclosed in the foregoing specification without departing from the invention or sacrificing the advantages thereof.

In the claims the term "2-pyridone" is intended to include also the derivatives of this compound.

We claim:—

1. The process of producing halogen-substituted 2-pyridone comprising dissolving the 2-pyridone in suitable solvents and halogenating the dissolved compound.

2. The process of producing iodine-substituted 2-pyridone comprising dissolving 2-pyridone in a suitable solvent and iodizing the dissolved compound.

3. The process of producing 2-oxy-3.5-iodo pyridine comprising dissolving 2-pyridone in dilute hydrochloric acid and adding iodine mono chloride.

In testimony whereof we affix our signatures.

MAX DOHRN.
RALPH DIRKSEN.